United States Patent
Benveniste (10) Patent No.: US 7,706,341 B2
(45) Date of Patent: Apr. 27, 2010

(54) ACCOUNTING FOR TELECOMMUNICATIONS TERMINAL MOBILITY IN CALL ADMISSION CONTROL

(75) Inventor: Mathilde Benveniste, South Orange, NJ (US)

(73) Assignee: Avaya Inc., Basking Ridge, NJ (US)

( * ) Notice: Subject to any disclaimer, the term of this patent is extended or adjusted under 35 U.S.C. 154(b) by 581 days.

(21) Appl. No.: 11/461,992

(22) Filed: Aug. 2, 2006

(65) Prior Publication Data

US 2008/0031202 A1    Feb. 7, 2008

(51) Int. Cl.
*H04W 4/00*    (2006.01)

(52) U.S. Cl. .................... 370/338; 455/452.2; 370/328

(58) Field of Classification Search ................ 455/428, 455/456, 435–444, 452.2–453, 524–525; 370/331–332, 328, 338
See application file for complete search history.

(56) References Cited

U.S. PATENT DOCUMENTS 6,683,852 B2    1/2004    Nagarajan et al.
7,369,490 B2 *  5/2008    Azami et al. ................ 370/230
2005/0052996 A1  3/2005   Houck et al.
2005/0220019 A1  10/2005  Melpignano
2007/0053323 A1 * 3/2007  Imaizumi et al. ............ 370/332

* cited by examiner

*Primary Examiner*—Kamran Afshar
*Assistant Examiner*—Ezana Getachew
(74) *Attorney, Agent, or Firm*—DeMont & Breyer, LLC (57) ABSTRACT

A technique is disclosed to optimize the call admission control algorithm that governs a shared-communications channel, in which the algorithm accounts for the levels of mobility, on an individual basis, of one or more terminals that need to use the channel. Instead of determining the variation in the distribution of supported data rates aggregated across multiple terminals—which can result in a greater variance in the call admission criterion—the technique of the illustrative embodiment tracks the variation in the distribution, for each terminal, of the data rates for that terminal. In short, the technique of the illustrative embodiment accounts for the variance in data rates that is attributed to the mobility of individual, representative terminals and not to the variance that is attributed to the spatial distribution of multiple terminals.

20 Claims, 9 Drawing Sheets

* CDF = Prob [ch_occupancy ≤ $BW$ ]

ACCOUNTING FOR TELECOMMUNICATIONS TERMINAL MOBILITY IN CALL ADMISSION CONTROL

REFERENCE TO RELATED APPLICATIONS

This application incorporates herein by reference the underlying concepts, but not necessarily the nomenclature, of U.S. patent application Ser. No. 11/317,514, filed on 23 Dec. 2005, entitled "Call Admission Control for Mobility-Capable Telecommunications Terminals."

FIELD OF THE INVENTION

The present invention relates to telecommunications in general, and, more particularly, to admitting a call in a shared-access system.

BACKGROUND OF THE INVENTION

Figure 1:
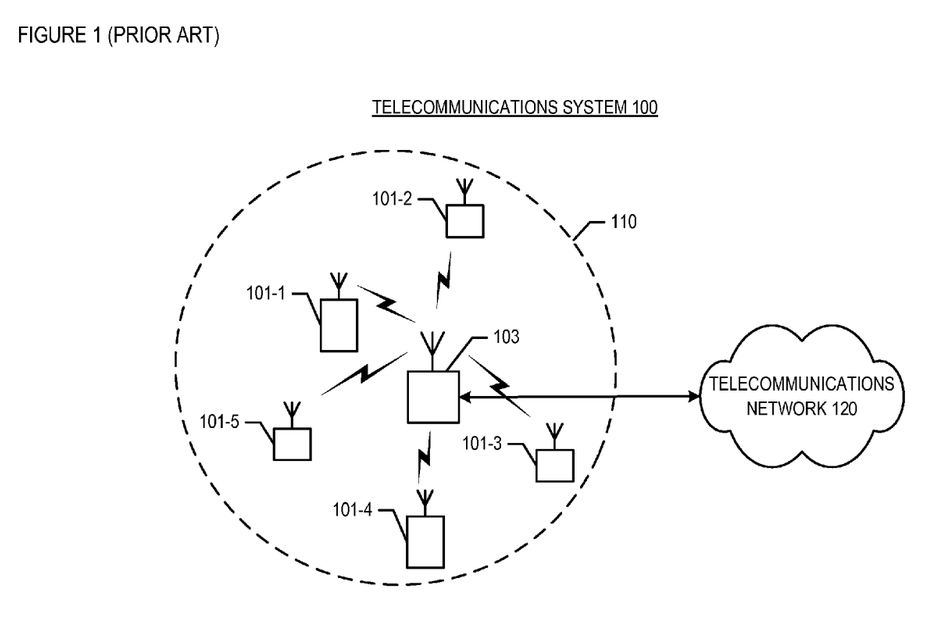
FIG. 1 depicts a diagram of telecommunications system 100 in the prior art.

FIG. 1 depicts a diagram of telecommunications system 100 in the prior art. Telecommunications system 100 comprises wireless telecommunications terminals 101-1 through 101-L, wherein L is a positive integer that is equal to five in the example depicted; access point 103 that serves basic service area 110; and telecommunications network 120, all of which are interconnected as shown.

Basic service area 110 is the service area in which shared access to other nodes in telecommunications system 100 is provided to telecommunications terminals such as terminals 101-1 through 101-L. As depicted in FIG. 1, basic service area 110 is in an IEEE 802.11 wireless local area network. In area 110, the one or more wireless telecommunications terminals that make up the basic service set of area 110 are able to access other nodes in system 100 via a shared-communications channel supported by access point 103.

Telecommunications network 120 is a telecommunications network such as the Internet, the Public Switched Telephone Network (PSTN), and so forth. Network 120 comprises or is connected to one or more transmission-related nodes such as gateways, routers, or switches that are used to direct packets from one or more sources to the correct destinations of those packets.

The service provided by the path that links a first node with a second node is characterized by its "quality of service." Quality of service, for the purposes of this specification, is defined as, from one node to another, a function of the (i) bandwidth, which can be expressed in units such as bits per second, (ii) error rate, which can be expressed in units such as bit errors per number of bits transmitted, and (iii) latency, which can be expressed in units such as seconds. For example, a shared-communications channel that links a wireless terminal such as terminal 101-1 with an access point such as access point 103 is subject to a quality-of-service level.

Each of telecommunications terminals 101-l, for l=1 through L, is a communications device such as a local area network telephone, a notebook computer, a personal digital assistant (PDA), a tablet PC, and so forth. Terminals 101-1 through 101-L are assigned fixed Internet Protocol addresses and, as wireless stations, are assigned Internet Protocol addresses from a pre-specified block of addresses. Terminals 101-1 through 101-L communicate, through access point 103, with other telecommunications terminals that have connectivity with network 120. In order to communicate, a user at a first telecommunications terminal in system 100, such as terminal 101-1, places a "call" (e.g., voice call, email, text chat, video, etc.) to a user at a second terminal in system 100.

Each telecommunications terminal may use a "codec," as is known in the art, to more efficiently transmit user information, such as voice signals, by compressing the transmitted information and decompressing the received information. A codec has an associated "codec rate" that specifies how much (compressed) information actually has to be transmitted per unit time.

System 100 has to be able to determine whether to admit each call. Call admission control is necessary, considering that terminal 101-1 is also competing with other terminals in its basic service area (i.e., area 110) for the shared-communications channel provided by access point 103. In fact, access point 103 has to be able to handle multiple traffic streams—each stream comprising a series of packets—that are transmitted to or from wireless terminals via the corresponding shared-communications channel.

Furthermore, each terminal has an associated level of mobility. A terminal that is immobile (i.e., is fixed) is able to support a maximum data rate that is more-or-less constant. In contrast, as a mobility-capable terminal moves closer to or away from its access point, the maximum data rate at which the terminal is able to communicate with the access point changes during a call. When the terminal is close to the access point, the signal is generally stronger and, as a result, the maximum data rate is higher. Likewise, when the terminal is far from the access point, the signal is generally weaker and, as a result, the maximum data rate is lower. As a result, the actual shared-communications channel bandwidth that the terminal utilizes—that is, the channel occupancy used by the terminal—during a call changes over time. Furthermore, there can be multiple terminals using the shared-communications channel for calls, where each terminal is able to move independently of one another during a call.

In some techniques in the prior art, the spatial distribution of the different terminals within the basic service area might be considered during the call admission process. This is advantageous in that it considers the data rates for the actual shared-communications channel, instead of merely using data rates from an analytical model of the basic service area. However, this is disadvantageous in that the terminals, being at different distances from the access point, have different supported data rates, which can cause the call admission criterion to have greater variance and lower the utilized bandwidth. As a consequence in some cases, the net effect is to allow fewer calls.

SUMMARY OF THE INVENTION

The present invention is a technique to optimize the call admission control algorithm that governs a shared-communications channel, in which the algorithm accounts for the levels of mobility, on an individual basis, of one or more terminals that need to use the channel. Instead of determining the variation in the distribution of supported data rates aggregated across multiple terminals—which can result in a greater variance in the call admission criterion—the technique of the illustrative embodiment tracks the variation in the distribution, for each terminal, of the data rates for that terminal. In short, the technique of the illustrative embodiment accounts for the variance in data rates that is attributed to the mobility of individual, representative terminals and not to the variance that is attributed to the spatial distribution of multiple terminals.

Conceptually, each monitored terminal that uses a particular shared-communications channel has an associated "probability of transition" that is related to the terminal's level of mobility, in which the probability of transition refers to the likelihood that the terminal's supported data rate will increase or decrease, relative to the current supported data rate. The probability of transition of a particular terminal is at or near zero if the terminal is immobile, such as a personal computer being used at a desk. On the other hand, the probability of transition of another terminal is high if that terminal is moving around the basic service area, as in the case of a user walking with a WiFi-enabled handset. In accordance with the illustrative embodiment of the present invention, the probabilities of transitions for a representative set of terminals are, in essence, accounted for in determining the channel occupancy for a set of simultaneous calls. As a result, by using the technique of the illustrative embodiment, a shared-communications channel that serves various mobility mixes of terminals is able to handle more calls simultaneously because the variation in the distribution of the data rate measurements that is used in the call admission criterion is often less than it is with some techniques in the prior art.

In accordance with the illustrative embodiment of the present invention, a channel utilization manager accounts for the probabilistic nature of the call admission decision by using a continually-refined value to represent the channel occupancy. The "per-call" channel occupancy value is determined by a number of factors, including the levels of mobility that are associated with the various telecommunications terminals. The per-call channel occupancy for a given level of mobility and shared-communications channel data rate is updated through empirical observation, and is used in the manner described below.

In accordance with the illustrative embodiment, channel occupancy is incorporated into one or more cumulative distribution functions (CDF) of channel occupancy. For a given shared-communications channel, each channel occupancy CDF represents the probability of a given channel occupancy level, while taking into account the number of calls (e.g., 1 call, 2 calls, etc.) and other parameters that include (i) the variability in the maximum data rates of the terminals present, (ii) the levels of mobility being experienced in the coverage area, and (iii) the application of different data-transmission requirements (e.g., codec rate, etc.) to each of those terminals when on a call.

The channel utilization manager is able to refine the channel occupancy values during the processing of live calls on a shared-communications channel. The access point that supports the channel regularly reports to the manager the data rate supported by a terminal, for multiple terminals that are monitored. In accordance with the illustrative embodiment, for each terminal, the level of mobility is updated by recalculating a measure of the variation in the distribution of supported data rates for the particular terminal; the channel occupancies are, in turn, are updated by factoring in the level of mobility of one or more terminals.

When the channel utilization manager considers admitting a candidate call and that call would be the Nth concurrent call on the shared-communications channel, the manager evaluates channel occupancy by using the N-call CDF for the mix of mobility levels employed by the established calls and the new call. For example, one five-call CDF might be for 2 fixed calls and 3 mobile calls, while another five-call CDF might be for 4 fixed calls and 1 mobile call. The evaluation determines whether the resulting channel occupancy would be less than or equal to an adjustable bandwidth threshold (e.g., 80 percent of the channel's limit, etc.), at a probability that exceeds confidence level (e.g., 98%, etc.). If this admission criterion is met, the channel utilization manager admits the call, in accordance with the illustrative embodiment of the present invention.

Although the utilization management in the illustrative embodiment is applied to the managing of a shared-communications channel, the present invention can be applied to managing other types of resources that are shared by users, as those who are skilled in the art will appreciate.

The illustrative embodiment of the present invention comprises: receiving i) a plurality of data rate measurements, wherein the data rate measurements in the plurality are of the physical layer data rates that are supported over a shared-communications channel by one or more telecommunications terminals, and ii) a data-transmission requirement for a call that is to involve a first telecommunications terminal, wherein the first telecommunications terminal has transmitted at least part of the data-transmission requirement via the shared-communications channel; calculating a first measure of the variation in the distribution of a first set of data rate measurements taken from the plurality, wherein the data rate measurements in the first set are for a single telecommunications terminal; and determining whether to admit the call on the shared-communications channel, based on (i) the first measure and (ii) the data-transmission requirement.

DETAILED DESCRIPTION

The following terms are defined for use in this Specification, including the appended claims:

The term "data-transmission requirement," and its inflected forms, is defined as a requirement for the proper transmission of data, wherein the data transmission occurs via a communications resource, such as a wireless shared-communications channel. Examples of data-transmission requirements include the data periodicity to be maintained, quality-of-service requirements (i.e., related to bandwidth required, maximum error rate, and maximum latency), and so forth. The required bandwidth refers to the data rate, or the channel time, that is required for the traffic stream of data to be transmitted.

The term "traffic stream description," and its inflected forms, is defined as the information that specifies the data-transmission requirements, either explicitly or implicitly. For example, instead of explicitly stating a requirement (e.g., data rate of 1 Mbps, etc.), the traffic stream description might identify the codec, as is known in the art, to be used by a wireless terminal during a call, wherein the particular choice of codec implies a certain bandwidth requirement for the call. A telecommunications terminal that is preparing to communicate data originates the traffic stream description.

The term "call," and its inflected forms, is defined as a communication of user information between two or more telecommunications terminals. Examples of a call are a voice telephone call, an email, a text-based instant message [IM] session, a video conference, etc.

Figure 2:
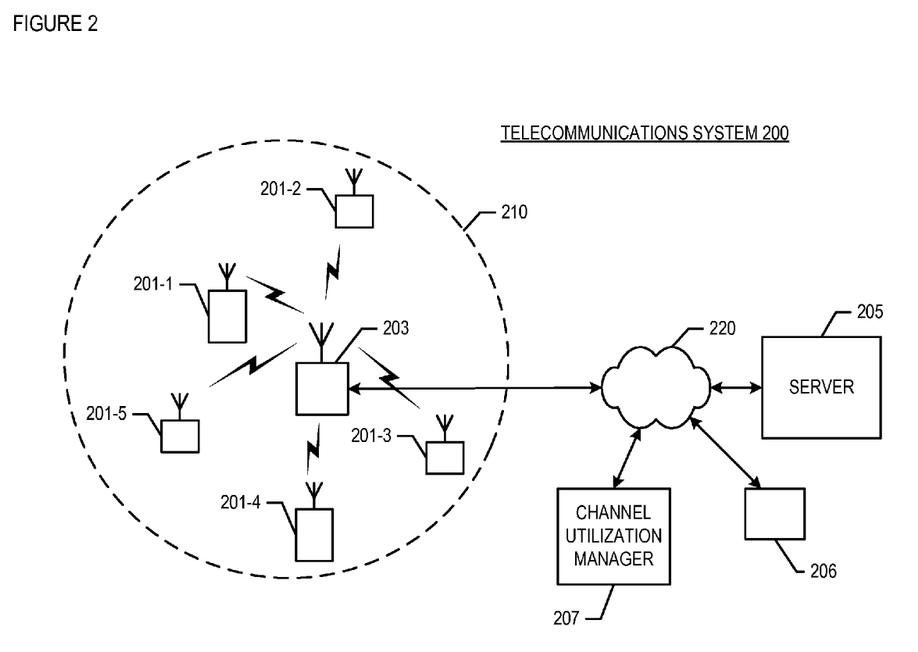
FIG. 2 depicts a diagram of telecommunications system 200 in accordance with the illustrative embodiment of the present invention.

FIG. 2 depicts a diagram of telecommunications system 200 in accordance with the illustrative embodiment of the present invention. Telecommunications system 200 comprises wireless telecommunications terminals 201-1 through 201-M, wherein M is a positive integer that is, in the illustrative embodiment, equal to five; access point 203 that serves basic service area 210; server 205; telecommunications terminal 206; channel utilization manager 207; and telecommunications network 220, interconnected as shown.

Telecommunications system 200 is capable of Session Initiation Protocol-based (SIP-based) signaling, in accordance with the illustrative embodiment. It will be clear to those who are skilled in the art, however, how to apply the present invention to some alternative embodiments that use other types of call-control signaling, such as H.323, as is known in the art.

Basic service area 210 is in a telecommunications network that provides shared access of other nodes in telecommunications system 200 to telecommunications terminals such as terminals 201-1 through 201-M. As depicted in FIG. 2, area 210 is in an IEEE 802.11 wireless local area network, in accordance with the illustrative embodiment. As those who are skilled in the art will appreciate, however, area 210 in some alternative embodiments can be in another type of shared-access network, such as an Ethernet network or cable modem-based network, either wired or wireless. In area 210, shared access is provided to one or more wireless telecommunications terminals via a shared-communications channel that is supported by corresponding access point 203.

Telecommunications network 220 is a telecommunications network such as the Internet, the Public Switched Telephone Network (PSTN), and so forth. Network 220 comprises or is connected to one or more transmission-related nodes such as gateways, routers, or switches that are used to direct packets from one or more sources to the correct destinations of those packets.

Each of telecommunications terminals 201-m, for m=1 through M, as well as terminal 206, is a communications device such as a local area network telephone, a notebook computer, a personal digital assistant (PDA), a tablet PC, and so forth, and has a contact identifier. Terminals 201-1 through 201-M are assigned fixed Internet Protocol addresses and, as wireless stations, are assigned Internet Protocol addresses from a pre-specified block of addresses. Terminals 201-1 through 201-M communicate, through access point 203, with other telecommunications terminals that have connectivity with network 220, such as terminal 206. For example, terminal 201-m is associated with access point 203 as depicted in FIG. 2 and uses the corresponding shared-communications channel to communicate wirelessly with other devices. In order to communicate, a user at a first telecommunications terminal in system 200, such as terminal 201-1, places a "call" (e.g., voice call, email, text chat, video, etc.) to a user at a second terminal in system 200, such as terminal 206. Terminals 201-1 through 201-M are also capable of communicating with one another with the attendant call control signaling being routed through one or more nodes connected to network 220, as described below.

Terminals 201-1 through 201-M are capable of varying levels of mobility, with respect to one another. Each terminal 201-m's level of mobility at a particular moment is determined by the terminal's design or use, or both. For example, terminal 201-1 might be a WiFi handset that its user can carry around while talking, in which case terminal 201-1 has high level of mobility associated with it, at least while it is moving. In contrast, terminal 201-2 might be a notebook computer parked on a desk, in which case terminal 201-2 has a low level of mobility associated with it.

It will be clear to those skilled in the art how to make and use terminals 201-1 through 201-M and terminal 206.

Access point 203 is an access point as is known in the art that exchanges packets that convey data (e.g., control messages, voice traffic, video streams, etc.) with one or more wireless telecommunications terminals, such as terminal 201-m, via its shared-communications channel. Access point 203, in well-known fashion, employs a contention-based protocol (e.g., IEEE 802.11 DCF, etc.) for ensuring that a wireless terminal or access point can gain exclusive access to the shared-communications channel for an interval of time in order to transmit packets.

Access point 203 also has to be able to handle traffic streams, each of which comprising a series of packets, that are transmitted to or from wireless terminals via the shared-communications channel. In accordance with the illustrative embodiment, access point 203 is capable of handling the requests from an associated wireless terminal to admit such a traffic stream. It will be clear to those skilled in the art how to make and use access point 203.

Server 205 is a Session Initiation Protocol (SIP) proxy server, as is known in the art. In accordance with the illustrative embodiment of the present invention, server 205 also transmits information to channel utilization manager 207 to determine whether a call should be allowed on a shared-communications channel. How server 205 interacts with other nodes in setting up and managing calls is described below and with respect to FIGS. 4 through 9.

As those who are skilled in the art will appreciate, in some alternative embodiments, server 205 can be a different type of server such as another type of SIP server or another type of call-control server that uses a different protocol (e.g., H.323, etc.). In any event, it will be clear to those skilled in the art, after reading this specification, how to make and use server 205.

In accordance with the illustrative embodiment, channel utilization manager 207 provides the admission control to handle requests to add traffic streams that utilize the shared-communications channels of one or more access points, including access point 203. The salient components of manager 207 are described below and with respect to FIG. 3. If, for example, the channel utilization of a particular shared-communications channel exceeds a predetermined level, manager 207 may disallow a new call on that channel.

Manager 207 is able to receive the following information from the specified nodes:
  i. a registration, from an access point such as access point 203;
  ii. a notification that a terminal has associated with an access point such as access point 203;

iii. a message that contains the physical data rate that is supported by a terminal active in a call (i.e., the supported data rate), where the message can be sent repeatedly to update the supported data rate;

iv. a notification that a terminal has disassociated from an access point such as access point 203;

v. a measurement of the shared-communications channel quality (e.g., noise, collision rate, frame or bit error rate, etc.), from an access point such as access point 203;

vi. the bandwidth that is committed through IEEE 802.11e traffic specifications (TSPEC), as are known in the art, to traffic streams that do not involve server 205 (e.g., direct link protocol [DLP] transmissions, etc.);

vii. a resource reservation request for a particular call, from server 205; and viii. a notification of the ending of a particular call, from server 205.

In addition, manager 207 is able to transmit the following information to the specified nodes:

i. a resource reservation response for a particular call, to server 205; and ii. a notification that an existing call is being rejected, to server 205.

How manager 207 interacts with access point 203 and server 205 in admitting and enabling calls is described below and with respect to FIGS. 4 through 9. It will be clear to those skilled in the art, after reading this specification, how to make and use manager 207.

Figure 3:
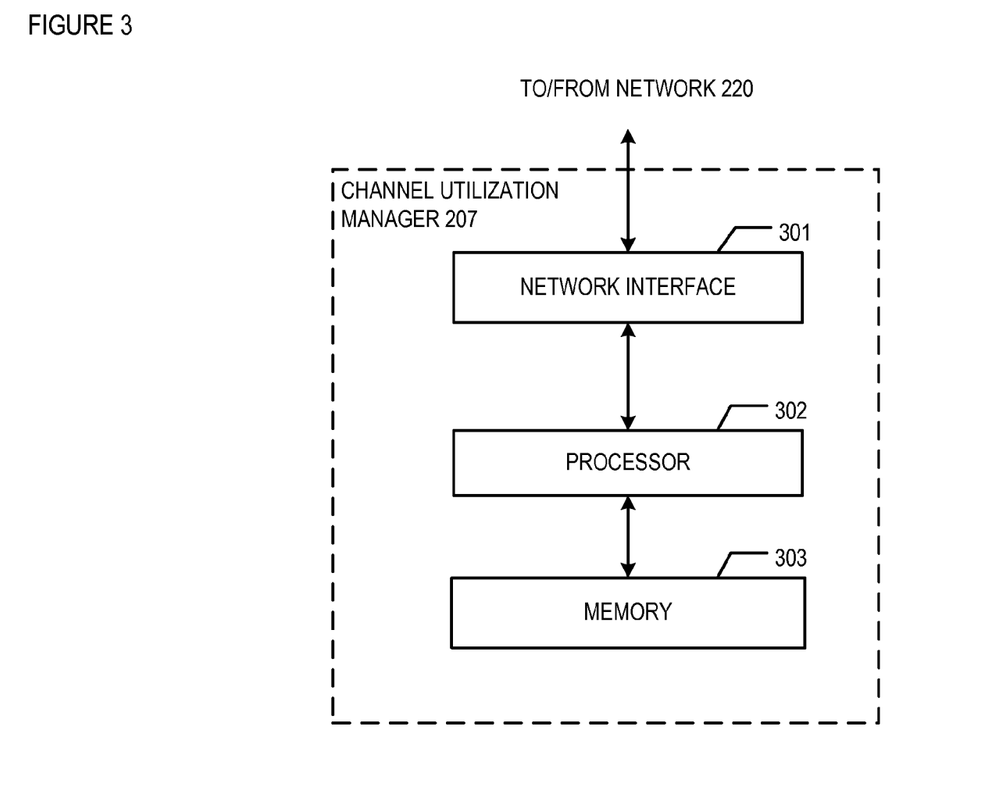
FIG. 3 depicts the salient components of channel utilization manager 207 in accordance with the illustrative embodiment of the present invention.

FIG. 3 depicts the salient components of channel utilization manager 207 in accordance with the illustrative embodiment of the present invention. Manager 207 comprises network interface 301, processor 302, and memory 303, interconnected as shown.

Network interface 301 receives signals from other nodes via network 220 and forwards the information encoded in the signals to processor 302, in well-known fashion. Network interface also receives information from processor 302 and transmits signals that encode this information to other nodes via network 220, in well-known fashion. It will be clear to those skilled in the art, after reading this specification, how to make and use network interface 301.

Processor 302 is a general-purpose processor that is capable of receiving information from network interface 301, executing instructions stored in memory 303, reading data from and writing data into memory 303, executing the tasks described below and with respect to FIGS. 4 through 9, and transmitting information to network interface 301. In some alternative embodiments of the present invention, processor 302 might be a special-purpose processor. In either case, it will be clear to those skilled in the art, after reading this specification, how to make and use processor 302.

Memory 303 stores the instructions and data used by processor 302. Memory 303 might be any combination of random-access memory (RAM), flash memory, disk drive memory, and so forth. It will be clear to those skilled in the art, after reading this specification, how to make and use memory 303.

Figure 4:
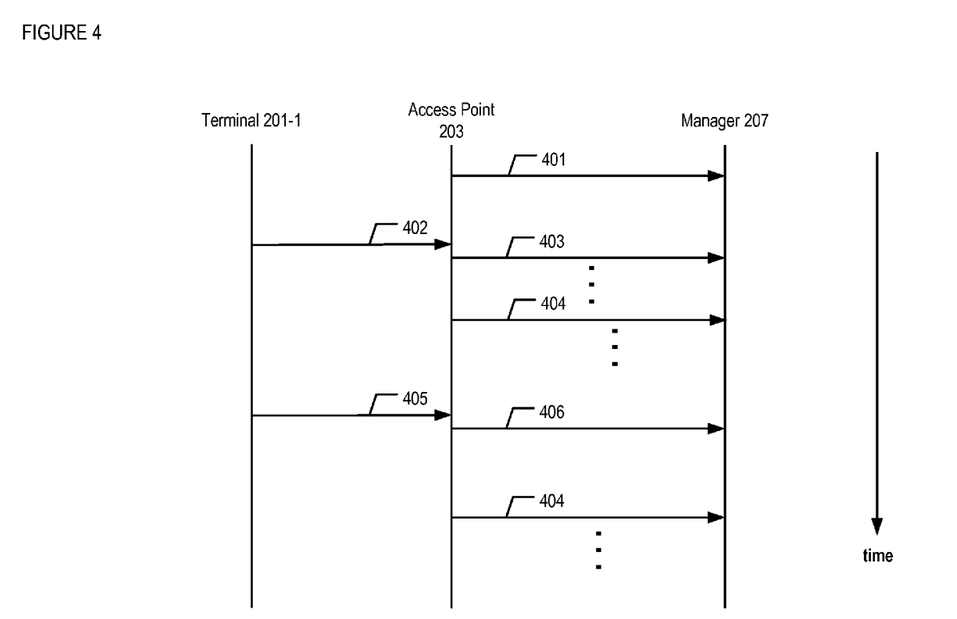
FIG. 4 depicts an illustrative series of messages that are exchanged between (i) access point 203 and (ii) channel utilization manager 207 during the course of managing terminal 201-1.

FIG. 4 depicts an illustrative series of messages that are exchanged between (i) access point 203 and (ii) channel utilization manager 207 during the course of managing terminal 201-1, in accordance with the illustrative embodiment of the present invention. Although interaction with a single terminal is depicted, as those who are skilled in the art will appreciate, access point 203 and manager 207 are able to handle information exchanges with multiple terminals concurrently. As those who are skilled in the art will appreciate, some of the messages that are depicted in FIG. 4 can be transmitted or received in a different order than that depicted.

When an access point initializes, it registers with channel utilization manager 207. As depicted in FIG. 4, access point 203 transmits registration message 401 to manager 207. The registration message from the access point identifies the capability of the physical layer of the shared-communications channel (e.g., IEEE 802.11a-capable, IEEE 802.11g-capable, etc.) to manager 207, which uses the information to determine the physical layer data rate of the particular shared-communications channel. The registration message also reports environmental parameters that affect capacity, including background noise, transmission attempt failure rate, and so forth; the access point may also transmit a registration message when an environmental parameter, such as background noise, changes. Furthermore, if there are IEEE 802.11e traffic specifications that are admitted by access point 203 without server 205 being involved, the access point reports to manager 207 the total bandwidth committed to all the terminals in the corresponding basic service area (i.e., area 210).

When a telecommunications terminal associates with an access point, the access point updates manager 207. As depicted in FIG. 4, terminal 201-1 for example associates with access point 203 by transmitting message 402; access point 203 indicates this to manager 207 by transmitting message 403, which comprises the Internet Protocol address and physical layer capabilities of terminal 201-1, including the terminal's physical layer data rate. The access point may also transmit message 403 when the physical layer data rate of the terminal changes, which may occur when, for example, the terminal moves closer to or away from the access point and supports a different maximum data rate than before.

Meanwhile, in some embodiments, access point 203 continually updates manager 207 on the quality of its shared-communications channel or committed bandwidth, or both, by transmitting message 404 either periodically or sporadically.

As depicted in FIG. 4, at some point terminal 201-1 disassociates with access point 203 via message 405, in well-known fashion. Accordingly, access point 203-1 transmits message 406 in response to disassociation message 405. Alternatively, a terminal may dissociate from access point 203 without sending a message; in this case, inactivity, as determined by the access point, triggers disassociation and causes the access point to update manager 207 about the disassociation.

Figure 5:
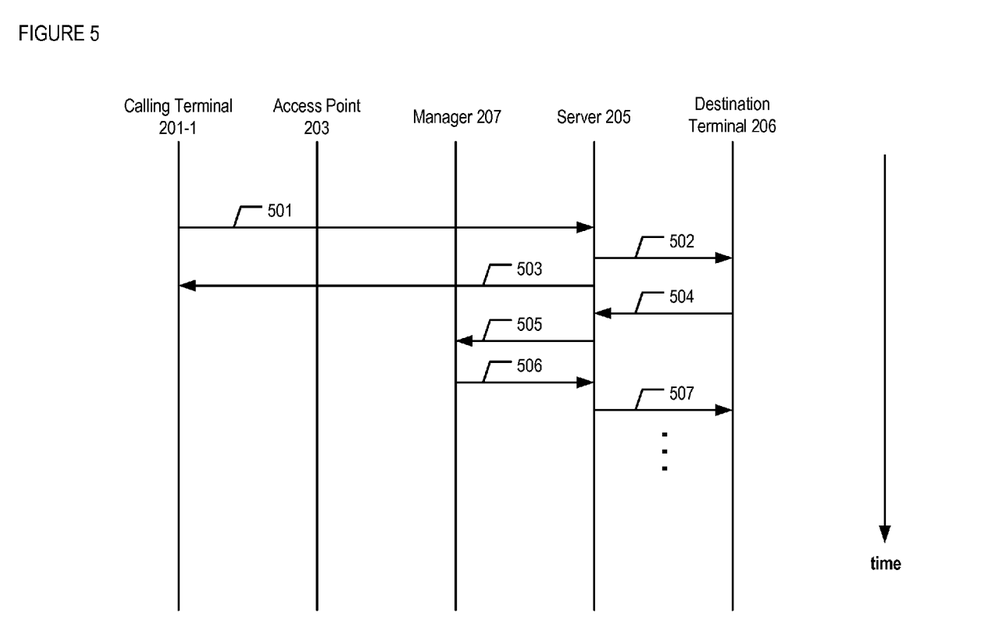
FIG. 5 depicts a diagram of the message flow associated with an example of the user of telecommunications terminal 201-1 calling a user at telecommunications terminal 206.

FIG. 5 depicts a message flow diagram that is related to handling calls between two telecommunications terminals, in which at least one of the terminals uses a shared-communications channel. In accordance with the illustrative embodiment, some or all of the message flow described above and with respect to FIG. 4 may occur concurrently with the message flow depicted in FIG. 5; for example, channel utilization manager 207 continually receives message 404 that reports channel quality from access point 203. Manager 207 might also repeatedly receive a message such as message 403, which can report a terminal's physical layer data rate as received by the access point. As those who are skilled in the art will appreciate, some of the messages that appear in FIG. 5 can be transmitted or received in a different order than the order depicted.

FIG. 5 depicts a diagram of the message flow associated with an example of the user of telecommunications terminal 201-1 calling a user at telecommunications terminal 206, in accordance with the illustrative embodiment of the present invention, wherein channel utilization manager 207 accepts the call. Terminal 201-1's user initiates the message flow by entering a command into terminal 201-1 to place a call to the other user. Terminal 201-1 transmits message 501, a SIP INVITE message, to server 205. Message 501 comprises (i) a traffic stream description (e.g., a SIP Real-Time Protocol [RTP] payload type, etc.) that specifies the nature of the call and (ii) the user identifier of the person being called. The traffic stream description also includes one or more data-transmission requirements (e.g., required bandwidth, etc.), as part of a media description for the candidate call.

Server 205 determines which terminal is currently associated with the user identifier of the called user (i.e., the "destination terminal"), and transmits message 502, a SIP OPTIONS message, to the destination terminal, in this case terminal 206, to determine the capabilities of that terminal (e.g., whether the destination terminal supports certain types of media, etc.). Server 205 also determines, in well-known fashion, from the calling terminal's Internet Protocol address that the server should remain on the signaling path that was used to receive the SIP INVITE message. Telecommunications system 200 uses the Record-Route header mechanism, as is well-known in the art, to indicate to server 205 that it will be a "call-stateful" proxy for the call. Accordingly, server 205 remains on the signaling path for at least part of the call, if admitted, in accordance with the illustrative embodiment.

Server 205 also transmits response message 503, a SIP TRYING message, back to wireless terminal 201-1, indicating that the server is attempting to set up the call.

Destination terminal 206 transmits message 504 to server 205 (e.g., a SIP OK message, etc.) in response to message 502.

Server 205 determines that terminal 201-1 is wireless and is served by an access point that is managed by channel utilization manager 207 (i.e., access point 203), and that manager 207 has to therefore be notified of the candidate call. Server 205 determines terminal 201-1's access method by checking terminal 201-1's Internet Protocol address against a list of addresses that correspond to terminals associated with wireless local area networks. As those who are skilled in the art will appreciate, server 205 can determine terminal 201-1's access method through other means in some alternative embodiments.

Subsequently, server 205 transmits message 505 to manager 207. Message 505 is a call-setup traffic specification, which comprises an admission request with a description of the traffic stream with one or more data-transmission requirements (e.g., periodicity, required data rate, etc.).

Channel utilization manager 207 receives message 505 from server 205 and stores the received call-setup traffic specification in a newly created record associated with the call. Manager 207 then determines whether it should admit the call on the shared-communications channel, in accordance with the illustrative embodiment of the present invention, as described below and with respect to FIGS. 6 through 9.

In the illustrative message flow depicted in FIG. 5, manager 207 determines that the candidate call is to be admitted. As a result, manager 207 (i) notes the additional call and the accompanying utilization in its database (i.e., sets or otherwise changes the value of a flag that signifies call admittance), and (ii) transmits acceptance message 506 to server 205, indicating that the candidate call is admitted.

Server 205 then transmits message 507, a SIP INVITE message, to destination terminal 206. Subsequently, server 205 continues to set up the call between terminals 201-1 and 206 in well-known fashion.

As those who are skilled in the art will appreciate, manager 207 might determine that a call is not to be admitted and, as a result, can transmit a message to server 205, indicating that the manager has rejected the call.

As those who are skilled in the art will further appreciate, manager 207 can handle the scenario in which terminal 201-1 moves from access point 203's coverage area to another access point's coverage area. In other words, system 200 is capable of performing a "handover" of terminal 201-1 from one access point to another. In some embodiments, manager 207 places a greater emphasis on admitting handover-related calls on a shared-communications channel than new calls. In those embodiments, in order to effectively reserve channel resources for handover-related calls, manager 207 rejects new calls at a lower utilization level than that of handover calls. Nevertheless, if the utilization level exceeds the level at which handover calls are to be rejected, manager 207 transmits a message to server 205 that indicates to the server that the existing call is unacceptable and that it should drop the call.

In some alternative embodiments, handover-related calls are admitted unconditionally or are admitted if they are of a specified priority level (e.g., E911 calls, etc.). If overall quality-of-service on the utilized shared-communications channel deteriorates, manager 207 can drop other calls or further lower the utilization level at which new calls are rejected.

Figure 6:
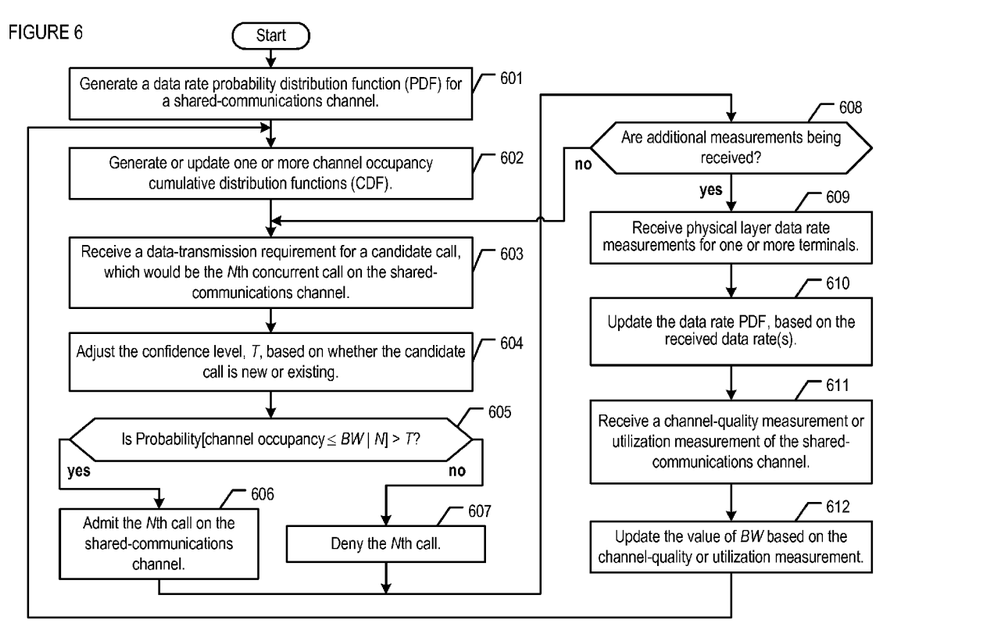
FIG. 6 depicts a flowchart of the salient tasks associated with channel utilization manager 207 determining whether to admit a call, in accordance with the illustrative embodiment of the present invention.

FIG. 6 depicts a flowchart of the salient tasks associated with channel utilization manager 207 determining whether to admit a call onto the shared-communications channel served by access point 203, in accordance with the illustrative embodiment of the present invention. In the example provided, terminal 201-1 is involved in the call that manager 207 is considering. As those who are skilled in the art will appreciate, some of the tasks that appear in FIG. 6 can be executed in a different order than the order depicted.

General Explanation—As terminal 201-1 moves closer to or away from access point 203, the terminal can change the actual data rate that it uses to communicate; consequently, the actual bandwidth that is utilized by the corresponding call changes.

In accordance with the illustrative embodiment, channel occupancy is incorporated into one or more cumulative distribution functions (CDF) of channel occupancy, the characteristics of which are determined, at least in part, by the levels of mobility that are associated with one or more of terminals 201-1 through 201-M. For a given shared-communications channel, each channel occupancy CDF represents the probability of a given channel occupancy level, while taking into account the number of calls (e.g., 1 call, 2 calls, etc.) and other parameters that include the variability in the maximum data rates of the terminals present. The probability distributions for 1 call, 2 calls, 3 calls, and so forth may be calculated either ahead of time or while processing the call admission decision to account for, while not being limited to, the following parameters:

i. each shared-communications channel physical layer rate supported (e.g., 54 Mbps, 11 Mbps, etc.);
    ii. the probability that a given terminal will be served at a given physical layer rate;
    iii. each quality-of-service criterion to be considered (e.g., 10 ms maximum delay, 50 ms maximum delay, etc.);
    iv. the data-transmission requirements for the call, including the codec to be used; and
    v. the probability of transition from one physical layer rate to another for each represented terminal.

When channel utilization manager 207 considers admitting a candidate call and that call would be the Nth concurrent call on the shared-communications channel, the manager evaluates the N-call CDF to determine whether the resulting channel occupancy would be less than or equal to an adjustable bandwidth threshold (e.g., 80 percent of the channel's limit, etc.), at a probability that exceeds the desired confidence level (e.g., 98%, etc.). If this admission criterion is met, channel utilization manager 207 admits the call, in accordance with the illustrative embodiment of the present invention.

In accordance with the illustrative embodiment, each channel-occupancy CDF of a shared-communications channel is generated from a distribution function (e.g., a probability distribution function [PDF], etc.) of the terminals' data rates on that channel. A probability distribution of the terminals' data rates is generated from analytical models or from ongoing data rate information received from an access point, or both. Estimating the data rate probability distribution provides an efficient way to derive a channel occupancy probability distribution for a variety of combinations of codec type and number of calls.

Channel utilization manager 207 is able to refine the channel occupancy values during the processing of live calls on a shared-communications channel. The access point that supports the channel (e.g., access point 203-1, etc.) regularly reports to manager 207 the data rate supported by a terminal, for multiple terminals. An empirically derived probability distribution, as such, reflects both the propagation environment and the spatial distribution of the terminals that are involved in calls in the basic service area. Thus, the probability distribution and call admission criterion are tailored to the particular basic service area monitored and supported by the access point.

Channel utilization manager 207 initially accounts for the probabilistic nature of the call admission decision by using a pre-determined, statistically justified value to represent the channel occupancy. The "per-call" channel occupancy value is determined by a number of factors, including the shared-communications channel data rate. The initial per-call channel occupancy for a given codec and shared-communications channel data rate is determined through empirical observation or through simulation models, and is used in the manner described below.

In accordance with the illustrative embodiment of the present invention, channel utilization manager 207 subsequently accounts for the probabilistic nature of the call admission decision attributable to mobility by using measurements of the supported data rate that manager 207 receives during the course of a call from a terminal, for one or more terminals, in the manner described below. Mobility is taken into account because those terminals with low or no mobility result in a CDF with a one set of characteristics (e.g., slope, point or range at which steepest slope occurs, etc.), while terminals with moderate mobility result in a CDF with another set of characteristics, while terminals with high mobility result in a CDF with still another set of characteristics.

Described Tasks—At task 601, manager 207 generates an initial data rate distribution function of telecommunications terminal data rates. At the start of the process, manager 207 receives the maximum physical layer rate of the shared-communications channel (e.g., via message 401, etc.) from the corresponding access point, such as access point 203. In some embodiments, manager 207 then uses known environmental conditions such as the applicable path loss and background noise level to estimate maximum data rates available at various distances from the access point, given the received maximum data rate of the channel. In this analytical model, manager 207 proceeds to estimate a hypothetical terminal's probability of being at various places in the coverage area of the shared-communications channel and, therefore, the probability of operating at various data rates. From this data, manager 207 then generates a data rate distribution function in well-known fashion.

Figure 7:
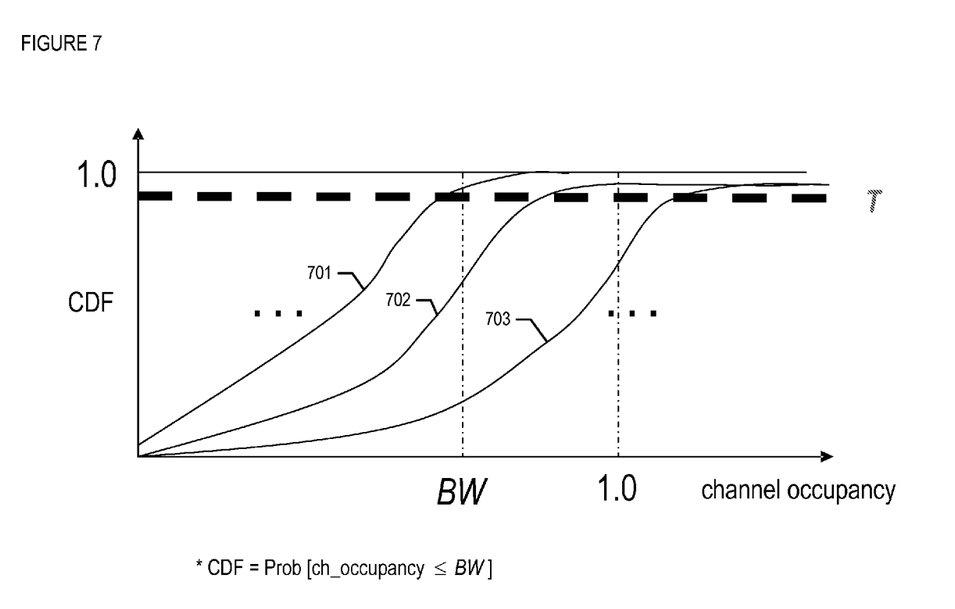
FIG. 7 depicts a set of cumulative distribution functions of channel occupancy for varying numbers of calls.

At task 602, manager 207 generates one or more channel occupancy cumulative distribution functions (CDF), in accordance with the illustrative embodiment, wherein the channel occupancy CDFs are based on the data rate distribution function generated at task 601. An illustrative set of channel occupancy CDFs is depicted in FIG. 7, in which the CDFs are graphically represented. As explained earlier, each of the channel occupancy CDFs accounts for a different number of calls, as well as different mixes of other parameters, such as codec rates. In a simplified scenario, however, in which the same data-transmission requirements apply for all calls (e.g., the same codec rate, etc.), it is possible to have exactly one channel occupancy CDF per each different value in the number of calls to be considered. For example, for a moderate level of mobility that is associated with area 210, curve 701 represents the CDF for 19 simultaneous calls, curve 702 represents the CDF for 20 simultaneous calls, and curve 703 represents the CDF for 21 simultaneous calls, in which all of the calls have the same data-transmission requirements.

In accordance with the illustrative embodiment, the channel occupancy CDFs are based, at least in part, on the levels of mobility of one or more terminals. The channel occupancy CDFs that are initially generated can incorporate an assumed or default level of mobility, such as the moderate level of mobility associated with the distribution functions depicted in FIG. 7. Subsequently, the levels of mobility that are associated with a shared-communications channel can be monitored and updated, as described below and with respect to FIG. 8.

As those who are skilled in the art will appreciate, in some embodiments the channel occupancy CDFs are generated without involving manager 207, while in some other embodiments some or all of the values are generated by manager 207. It should be obvious to those skilled in the art that when making a call admission decision, given that a mix of different codecs is used by the N calls, it is not necessary to generate the entire CDF of channel occupancy by N calls. It is sufficient to compute the probability that channel occupancy will not exceed the specified threshold level. If that probability is greater than or equal to the desired confidence level, the $N^{th}$ call is admitted.

At task 603, manager 207 receives a data-transmission requirement for a candidate call. The requirement, for example, can be a specified codec type and rate.

At task 604, manager 207 adjusts a confidence level, T, that will be used in the call admission process. In some embodiments, the value of T is based on whether the candidate call is a new call or a call being handed over from another shared-communications channel (i.e., an existing call). In some alternative embodiments, the value of T is unaffected by the type of call being considered. In some other alternative embodiments, the value of the parameter BW is based on whether the candidate call is a new or existing call.

At task 605, manager 207 evaluates the following inequality:

$$\text{Probability [channel occupancy} \leq BW | \text{calls\_description]} > T,$$

where BW is the fraction (e.g., 0.8, etc.) that can be allocated to calls of the total shared-communications channel, T is the confidence level, and calls_description refers to one or more parameters that describe the mix of calls, including:

i. N, which is the number of calls that would be concurrently using the shared-communications channel, ii. $QoS_{MIN}$, which refers to the minimum quality of service that is allowed throughout all calls present (e.g., delay less than 5 milliseconds, etc.), and iii. level_of_mobility, which refers to the level or levels of mobility associated with the shared-communications channel, and which is described below and with respect to FIG. 8.

The probability distribution used is the channel occupancy CDF for N number of calls. If the inequality is true, then the call can be admitted and task execution proceeds to task 606. If the inequality is false, then the call cannot be admitted and task execution proceeds to task 607. As those who are skilled in the art will appreciate, a different inequality or criteria can be used to assess whether a candidate call should be admitted or not.

At task 606, manager 207 admits the call and notifies other data-processing systems accordingly. Task execution then proceeds to task 608.

At task 607, manager 207 denies the call and notifies other data-processing systems accordingly.

At task 608, manager 207 checks if there are any shared-communications channel-related parameters that are being received. If there are, task execution proceeds to task 609. If not, task execution proceeds to task 603.

At task 609, manager 207 receives the current supported data rates of one or more of terminals 201-1 through 201-M via access point 203.

At task 610, manager 207 updates the data rate distribution function based on the data rates received at task 609. Over time, the mobility patterns of terminals in the actual operating environment influence the data rate distribution function that was initially generated based on assumptions. In this way, the data rate distribution function is updated to reflect the operating environment of basic service area 210 supported by access point 203.

At task 611, manager 207 receives, from access point 203, a channel-quality measurement (e.g., background noise, collision rate, etc.) of the shared-communications channel or a channel utilization measurement. For example, manager 207 might receive the information from access point 203 via message 405. The channel quality measurements are described above and with respect to FIG. 4.

At task 612, manager 207 optionally updates the BW parameter based on the parameters received at task 611. In this way, manager 207 considers the presence channel impairments (e.g., noise, etc.) and other traffic on the shared-communications channel, and their effects on the actual usable bandwidth of the channel. Task execution then proceeds to task 602. Manager 207, in some other embodiments, may also adjust the usable bandwidth by considering the bandwidth that is committed through IEEE 802.11e traffic specifications to traffic streams that do not involve server 205.

Figure 8:
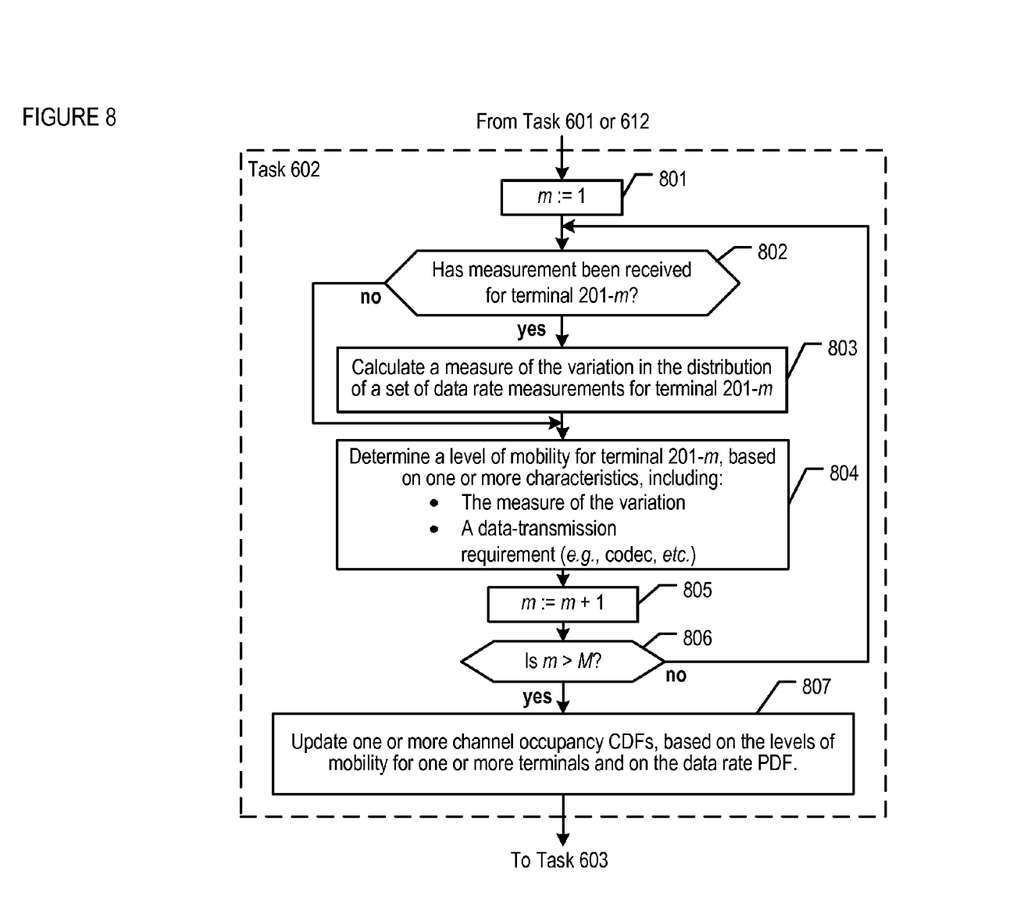
FIG. 8 depicts a flowchart of the salient tasks associated with channel utilization manager 207 updating one or more channel occupancy distribution functions, in accordance with the illustrative embodiment of the present invention.

FIG. 8 depicts a flowchart of the salient subtasks associated with channel utilization manager 207 executing task 602, in which manager 207 updates the channel occupancy cumulative distribution function, in accordance with the illustrative embodiment of the present invention. As those who are skilled in the art will appreciate, some of the tasks that appear in FIG. 8 can be executed in a different order than the order depicted.

At task 801, manager 207 initializes the telecommunications terminal counter, m.

At task 802, manager 207 checks if a supported data rate has been received for terminal 201-m. If one has been received, task execution proceeds to task 803. If not, task execution proceeds to task 804.

At task 803, manager 207 calculates a measure of the variation in the distribution of a set of data rate measurements for terminal 201-m, in accordance with the illustrative embodiment. This measure represents the probability of transition to a different supported data rate from the current rate for a particular terminal. For each terminal, manager 207 determines and maintains the measure of the variation by tracking the distribution of two or more received data rates that were experienced during a particular call, or even across multiple calls, involving that particular terminal on the particular shared-communications channel. In some embodiments, the measure that is calculated is the statistical variance of the data rate relative to the mean, while in some other embodiments the measure is the standard deviation.

At task 804, manager 207 determines a level of mobility for terminal 201-m, based on one or more characteristics that include, but are not limited to (i) the measure of the variation and (ii) a data-transmission requirement. For example, manager 207 can infer the level of mobility of a telecommunications terminal by using the codec specified in the data-transmission requirement by the terminal. In the example, a first type of codec might typically be associated with low-mobility applications, while a second type of codec might typically be associated with high-mobility applications.

At task 805, manager 207 increments the terminal counter, m.

At task 806, manager 207 determines whether the probabilities of transition for all of the terminals being monitored have been considered and updated when necessary. If so, task execution proceeds to task 807. If not, task execution proceeds to task 802.

At task 807, manager 207 updates the channel occupancy cumulative distribution function (CDF) for the shared-communications channel associated with basic service area 210, based on the levels of mobility of one or more telecommunications terminals, and on the data rate distribution function of the shared-communications channel. Task execution then proceeds to task 603.

Figure 9:
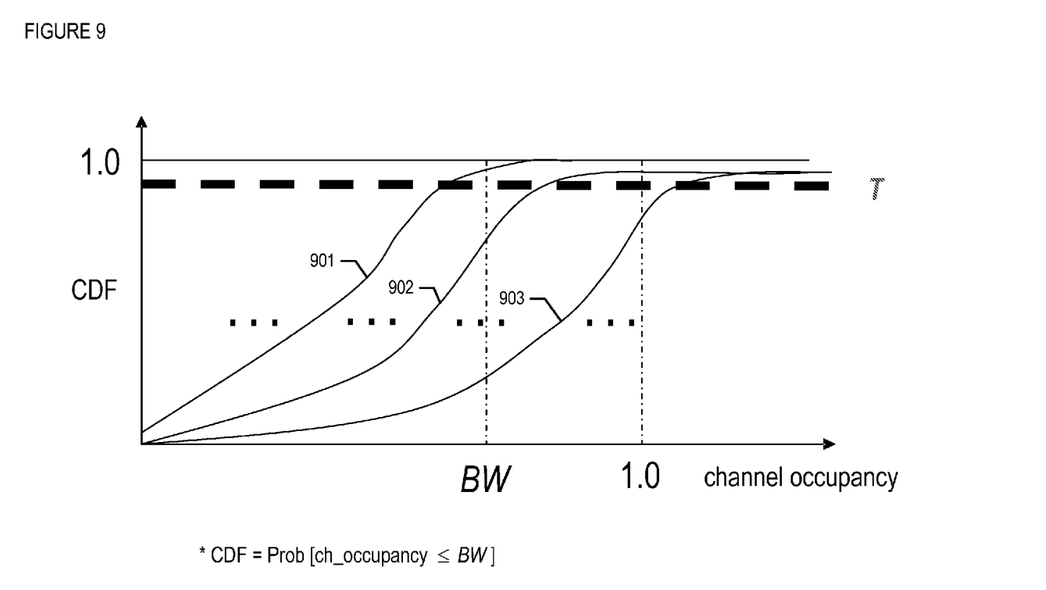
FIG. 9 depicts a set of cumulative distribution functions of channel occupancy for varying mixes of mobility present.

An illustrative set of updated channel occupancy CDFs is depicted in FIG. 9, in which the CDFs are graphically represented. Each of the channel occupancy CDFs accounts for a different level of mobility for a given number of calls, in this case twenty calls. For example, curve 901 represents the channel occupancy CDF for 19 calls from low-mobility terminals and 1 call from a high-mobility terminal. Curve 902 represents the channel occupancy CDF for 10 calls from low-mobility terminals and 10 calls from high-mobility terminals. Curve 903 represents the channel occupancy CDF for 1 call from a low-mobility terminal and 19 calls from high-mobility terminals. For pedagogical purposes, all of the twenty calls represented in each CDF are subject to the same data-transmission requirements and fit within the categories of "low-mobility" and "high-mobility"; however, it will be clear to those skilled in the art, after reading this specification, how to generate and use CDFs to account for differing data-transmission requirements and for a different set of mobility categories than that depicted.

Because a basic service area that typically serves a low-mobility mix of terminals has a lower overall variation in the data rate distribution than that of an area with a high-mobility mix, the low-mobility area is able to handle more calls, as reflected in the CDFs and as the result of the technique of the illustrative embodiment. As those who are skilled in the art will appreciate, the actual characteristics of each CDF can be different than that depicted for the various mobility mixes represented, and the depicted curves are mainly intended to illustrate that different channel occupancy CDFs can result from different levels of mobility, leading to a more optimized call admission control.

To illustrate the technique of the illustrative embodiment, three examples are presented here, in which each example comprises a different mobility mix of terminals. In the first example, all of the terminals in the mix are highly mobile, such as in a building's main corridor in which the terminal users are continually moving. In the second example, roughly half of the terminals are highly mobile, while half of the terminals hardly move (or are immobile) during calls, such as in a conference area where some users are sitting and some are walking around. In the third example, all of the terminals in the mix are of low mobility, such as in an office area, in which the users are sitting down.

In each example, a measure of the variation of the data rate distribution is maintained for each terminal monitored. In accordance with the illustrative embodiment, multiple measurements of the supported data rate are accumulated for one or more calls that involve a monitored terminal. In the high-mobility mix, the variation for each terminal indicates that the data rate varies significantly, which indicates that the terminals are highly mobile. In the moderate-mobility mix, the measure of variation for some of the terminals is large, implying high mobility, while the measure for other terminals is small, indicating low or no mobility. In the low-mobility mix, the variation for each terminal is close to zero, indicating little, if any, mobility.

What is significant is that for the second and third examples—that is, where the variation is lower than for the high mobility example—the variation is less than it would have been had the call admission control algorithm averaged together the supported data rate measurements across all of the terminals in the coverage area. And because the variation is, as a result, known to be lower for the particular basic service area, the call admission control algorithm does not have to be so conservative and, as a result, more calls can be supported simultaneously in that area. Furthermore, the measurements of the terminals in past calls can be applied to future calls, as the terminals involved in future calls will typically have a similar spatial distribution as the terminals involved in past calls because the coverage and the usage in the basic service area of interest remain more-or-less constant or, at least, tend to change only gradually.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:
   receiving, at a data-processing system:
   i) a plurality of data rate measurements, wherein the data rate measurements in the plurality are of the physical layer data rates that are supported over a shared-communications channel by one or more wireless telecommunications terminals, and
   ii) a data-transmission requirement for a call that is to involve a first telecommunications terminal, wherein the first telecommunications terminal has transmitted at least part of the data-transmission requirement via the shared-communications channel;
   calculating, at the data-processing system, a first measure of the variation in the distribution of a first set of data rate measurements taken from the plurality, wherein the data rate measurements in the first set are for a single telecommunications terminal, and wherein at least two data rate measurements in the first set have values that are different from each other; and
   admitting the call on the shared-communications channel, based on (i) the first measure and (ii) the data-transmission requirement.

2. The method of claim 1 wherein the first measure is one of (i) a standard deviation and (ii) a variance.

3. The method of claim 1 wherein the data rate measurements in the plurality are of the physical layer data rates that are supported over the shared-communications channel by two or more telecommunications terminals when involved in calls.

4. The method of claim 3 wherein at least one terminal has a first level of mobility and at least one other terminal has a second level of mobility.

5. The method of claim 1 wherein the data-transmission requirement specifies a first codec to be used for the call by the first telecommunications terminal.

6. The method of claim 5 further comprising inferring a level of mobility from the first codec specified by the data-transmission requirement.

7. The method of claim 1 the admitting of the call on the shared-communications channel is also based on a probability being greater than a threshold value that the channel occupancy of the shared-communications channel, as the result of admitting the call, will not exceed the available capacity, wherein the probability is derived from one or more probability distributions, wherein the one or more probability distributions comprise the first measure.

8. The method of claim 7 wherein the available capacity is based on one or more utilization measurements of the shared-communications channel.

9. A method comprising:
   receiving a plurality of data rate measurements at a data-processing system, wherein the data rate measurements in the plurality are of the physical layer data rates that are supported over a shared-communications channel by one or more wireless telecommunications terminals;
   calculating, at the data-processing system, a first measure of the variation in the distribution of a first set of data rate measurements taken from the plurality, wherein the data rate measurements in the first set are for a single telecommunications terminal, and wherein at least two data rate measurements in the first set have values that are different from each other; and generating, at the data-processing system, a first distribution function of the channel occupancy of the shared-communications channel, based on:
i) the first measure, and
ii) the plurality of data rate measurements.

10. The method of claim 9 further comprising:
receiving a data-transmission requirement for a call that is to involve a first telecommunications terminal, wherein the first telecommunications terminal has transmitted at least part of the data-transmission requirement via the shared-communications channel; and
admitting the call, based on the first distribution function; wherein the generating of the first distribution function is also based on the first data-transmission requirement.

11. The method of claim 10 wherein admitting the call comprises evaluating a probability being greater than a threshold value that the channel occupancy of the shared-communications channel, as the result of admitting the call, will not exceed the available capacity, wherein the shared-communications channel is already carrying (N−1) calls, wherein the probability is conditional on the value of N.

12. The method of claim 10 wherein the first data-transmission requirement specifies a first codec to be used for the call by the first telecommunications terminal.

13. The method of claim 12 further comprising inferring a level of mobility from the first codec specified by the data-transmission requirement.

14. The method of claim 13 wherein the first distribution function is also based on the level of mobility.

15. The method of claim 9 wherein the data rate measurements in the plurality are of the physical layer data rates that are supported over the shared-communications channel during two or more calls.

16. A method comprising:
generating, at a data-processing system:
a) a first distribution function of the physical layer data rates that are supported on a shared-communications channel; and
b) a second distribution function of the channel occupancy on the shared-communications channel, based on: (i) the first distribution function, (ii) N calls concurrently using the shared-communications channel, wherein N is a positive integer, (iii) a first level of mobility, and (iv) a second level of mobility;
receiving, at the data-processing system, an indication that a first telecommunications terminal is attempting to set up a call on the shared-communications channel, wherein the first level of mobility characterizes the first telecommunications terminal;
admitting the call on the shared-communications channel, based on the second distribution function, wherein the call is one of the N calls.

17. The method of claim 16 further comprising:
receiving a first plurality of data rate measurements, wherein the data rate measurements in the first plurality are of the physical layer data rates that are supported over a shared-communications channel by a single telecommunications terminal, and wherein at least two data rate measurements in the first plurality have values that are different from each other; and
determining the first level of mobility from the variation in the distribution of the data rate measurements in the first plurality.

18. The method of claim 17 further comprising:
receiving a second plurality of data rate measurements; and
determining the second level of mobility from the variation in the distribution of the data rate measurements in the second plurality;
wherein the second level of mobility characterizes a second telecommunications terminal.

19. The method of claim 16 wherein the first data-transmission requirement specifies a first codec to be used for the call by the first telecommunications terminal.

20. The method of claim 19 further comprising inferring the first level of mobility from the first codec specified by the data-transmission requirement.

* * * * *